P. R. JANNEY.
ICING MACHINE.
APPLICATION FILED JUNE 11, 1920.

1,418,715.

Patented June 6, 1922.
3 SHEETS—SHEET 3.

Inventor
Peyton R. Janney
By Whittemore, Hulbert & Whittemore
Attorneys

UNITED STATES PATENT OFFICE.

PEYTON R. JANNEY, OF DETROIT, MICHIGAN, ASSIGNOR TO MILLS BAKING COMPANY, OF DETROIT, MICHIGAN, A CORPORATION OF MICHIGAN.

ICING MACHINE.

1,418,715.      Specification of Letters Patent.      Patented June 6, 1922.

Application filed June 11, 1920. Serial No. 388,087.

*To all whom it may concern:*

Be it known that I, PEYTON R. JANNEY, a citizen of the United States of America, residing at Detroit, in the county of Wayne and State of Michigan, have invented certain new and useful Improvements in Icing Machines, of which the following is a specification, reference being had therein to the accompanying drawings.

The invention relates to machines for icing cakes and other articles of the kind, and has for its object the obtaining of an automatic mechanism for successively receiving icing and delivering the articles; second, economy in the quantity of material used; third, maintaining the icing free from crumbs, or anything else to contaminate; fourth, facilitating the quick change from one color or flavor to another with a minimum loss of material; fifth, maintaining temperature conditions most favorable for the operation; and sixth, the obtaining of various other advantages, as hereinafter described. With these objects in view the invention comprises the construction as hereinafter set forth.

The primary object of icing cakes is to protect the same from drying and this result can be accomplished with a comparatively thin coating of the icing material. There is, however, great difficulty in applying the icing uniformly to all parts of the surface of the cake without a thicker deposit on one portion than another; also, it is difficult to avoid waste of the icing or the contamination of the same by the dropping of crumbs. With my improvement the cakes are given a comparatively thin and uniform coating of the icing by the immersion of the same in an icing bath, the quantity of material in said bath being limited to only that sufficient for complete immersion. Furthermore, the operation of immersing and withdrawing the cakes is quickly performed and the drainage of icing is collected and returned for further use. In case of the breaking of the cake in the icing bath, the quantity of the icing lost is inconsiderable and where there is a change from one color or flavor to another, there is but little waste of material.

Generally described, my improved machine comprises an icing receptacle A of small dimensions sufficient only for the reception of a maximum size of cake operated upon with a slight clearance around the edges thereof. The quantity of icing in the receptacle is such that when the cake is pressed below the surface, the icing will flow up the sides and over the top, while the withdrawal of the cake will drain off the surface. To compensate for the material used each time a cake is dipped, there is a constant supply of icing to the receptacle and to prevent an over-supply, regulating means is provided for maintaining a constant level. The cakes are introduced and withdrawn from the bath by a vertically moving plunger carrier and cooperating with this plunger there is provided a conveyor system for intermittently feeding uniced cakes to the plunger and taking away the iced cakes therefrom.

In detail, B is a suitable framework on which is mounted in vertical guides C the plunger D, this being provided with a basket E for the reception of the cakes. The receptacle A is arranged in line with and beneath the plunger D and is removably supported upon a shelf F on the frame B. G is a large supply tank for the icing, which is mounted upon the upper portion of the frame B. At the bottom of the tank G is a valve controlled outlet, from which the icing flows down a spout I into the receptacle A. J is a pump for returning a portion of the material from the receptacle A to the tank G and which, as shown, is in the form of a chain and plunger pump with the outlet conduit J' extending into the receptacle A to the point where it is desired to maintain a level. The pump J is operated by mechanism hereinafter described and will thus maintain a constant level of the icing in the receptacle A.

Figure 1:
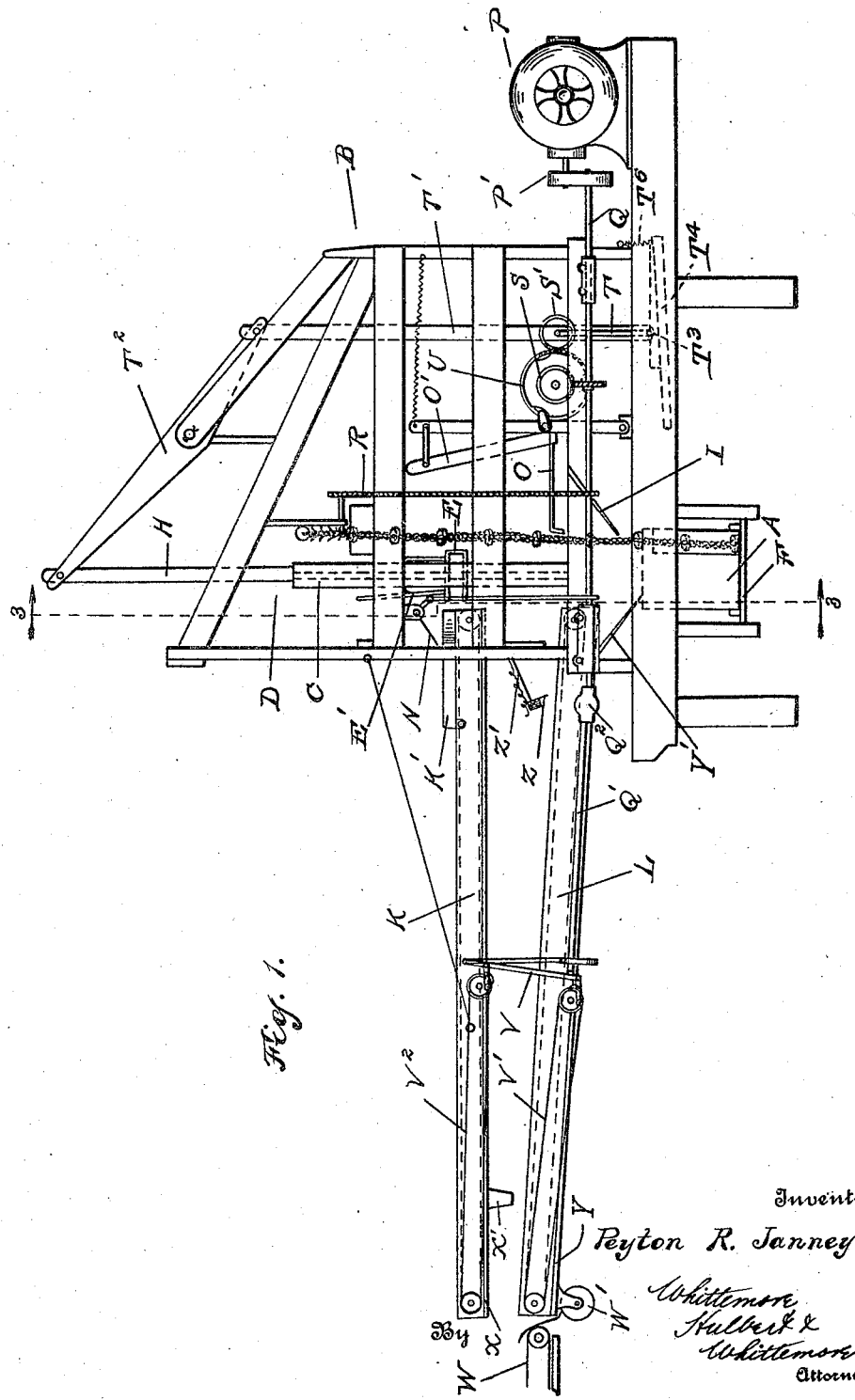
Figure 1 is a side elevation of the machine.
Figure 2:
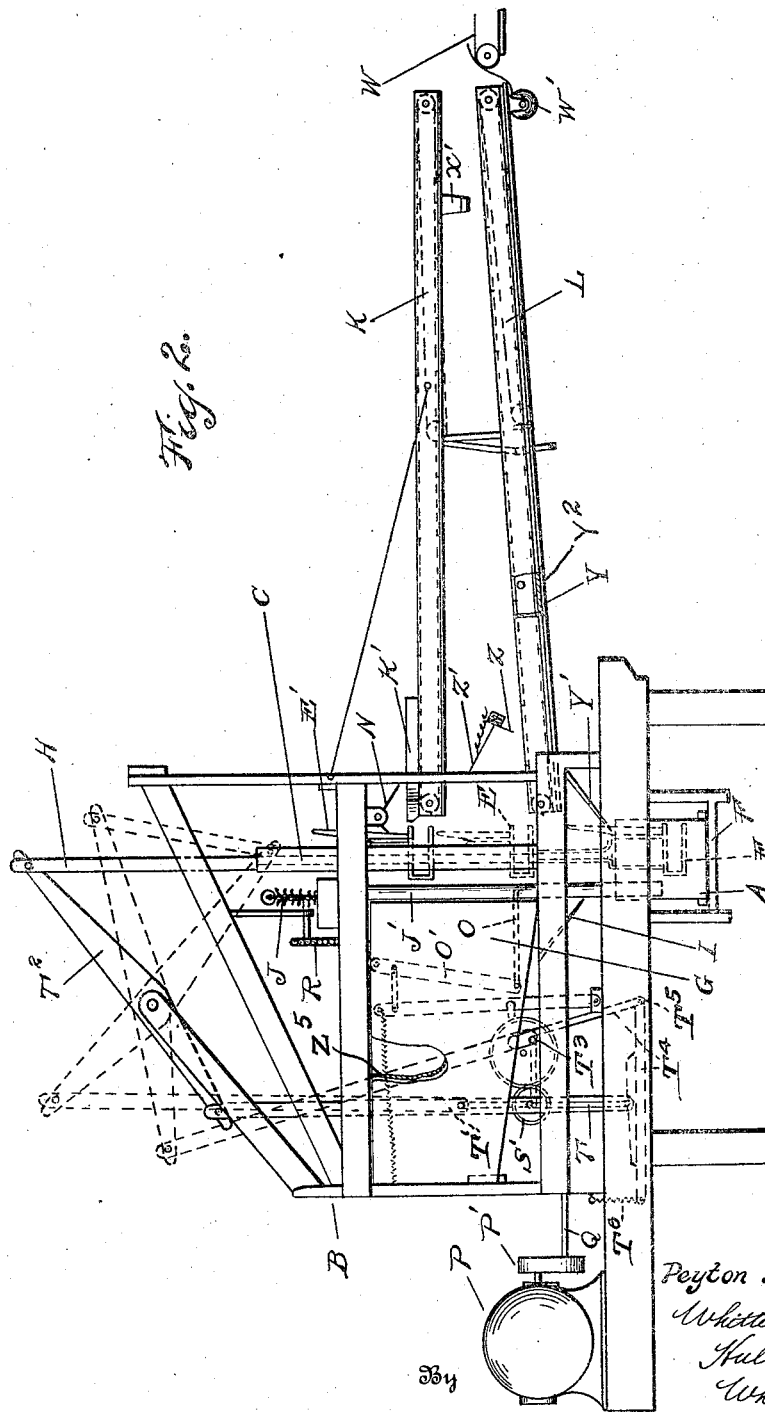
Figure 2 is a similar view from the opposite side.
Figure 3:
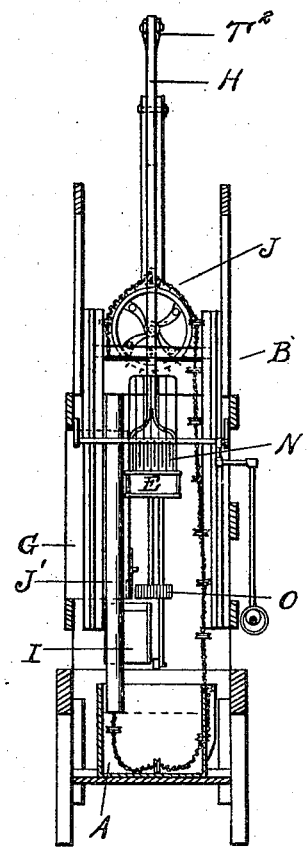
Figure 3 is a cross-section showing the icing receptacle and the manner of maintaining a constant level of material therein, taken on line 3—3 of Figure 1.
Figures 4, 5:
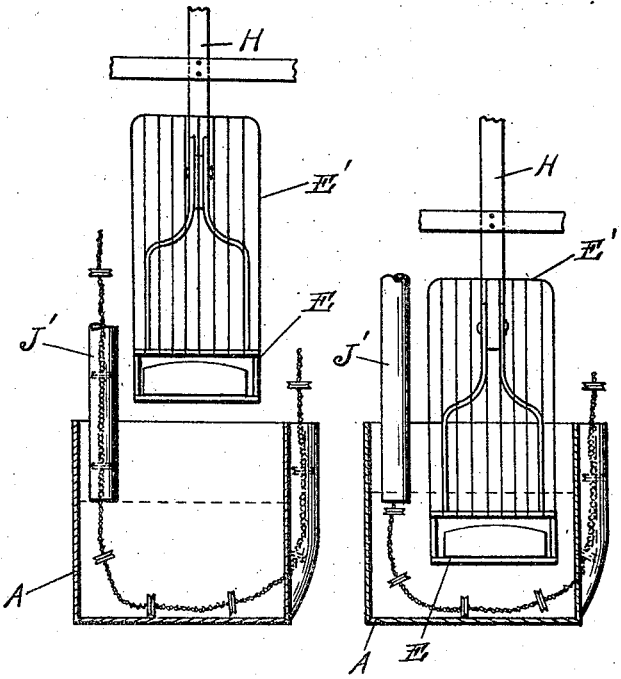
Figure 4 is a view showing the manner of transferring the cakes to the icing bath.
Figure 5 is a similar view showing the cake being immersed.
Figure 6:
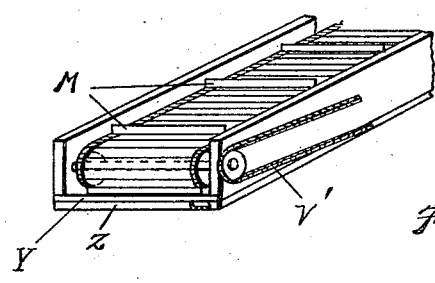
Figure 6 is a detail view of the lower conveyor showing both the conveying and operating chains.

For feeding the cakes to the plunger a conveyor K is arranged in a plane with which the basket E is periodically registered, and this conveyor is intermittently operated to advance a series of cakes towards the basket. In a lower plane is arranged a slightly inclined conveyor L and after the dipping operation, the basket E is registered with this conveyor. Both of these conveyors may be of the chain type having projecting bars M spaced to receive the cakes therebetween. A transfer N in the form of a rocker member is arranged to push a cake from the conveyor K into the basket E, when the latter is in registration, and an ejector O is arranged to push out the iced cakes from the basket onto the conveyor L. All of these mechanisms are operated in timed relation to each other by a drive mechanism, which, as shown, comprises a motor P operating through reduction gearing P' a shaft Q. This shaft directly drives a sprocket chain R for operating the pump J and also operates a timing mechanism S, which may be a Geneva movement, or other equivalent means. From this timing mechanism is intermittently operated a crank arm T, which has one end connected to a piston S' and its other end to the lower end of a rod T'. The upper end of this rod T' is connected with a walking beam lever $T^2$, the opposite end of which is connected with the plunger D through a swinging link H. The positions taken by the crank arm, rod T', and walking beam lever relative to the movement of the plunger D, is illustrated in dotted lines in Figure 2 of the drawings. In two positions of adjustment the crank arm engages notches $T^3$ in a rockable angular member $T^4$ which is shown pivoted at $T^5$ and held under tension at one end by a spring $T^6$. The timing mechanism S also operates a cam U for intermittently actuating the ejector O through the medium of a multiplying leverage O'. The conveyors K and L are operated through an extension Q' of the shaft Q connected to the latter through a universal joint $Q^2$ and mounted in connection with the conveyor L. This shaft reciprocates a ratchet lever V, which operates chains V' and $V^2$ for respectively intermittently driving the conveyors K and L. The timing of the whole apparatus is such that the operation is as follows:

The cakes to be iced are successively placed upon the conveyor K and are intermittently advanced towards the plunger D. This plunger is also intermittently actuated, but has intervals of rest where it is respectively in registration with the conveyors K and L. While it is registered with the conveyor K, one of the cakes thereon is pushed off from the conveyor into the basket E by the operation of the transfer N, which also is operated by a timed mechanism from the shaft Q. The cake thus deposited in the basket is carried downward by the movement of the plunger into the receptacle A, where it is completely immersed, the icing overflowing the top as well as coating the bottom and sides. The basket is immediately withdrawn and elevated to the point of registration with the conveyor L, where it remains stationary for a sufficient interval for the ejector O to shove out the iced cake onto the conveyor L. The plunger is then actuated to come into registration with the conveyor K, and the cycle is repeated. The iced cakes will be fed outward by the conveyor L until they reach the outer end thereof, when they will be transferred onto a receiving conveyor W, or other receiving means.

When the freshly baked cakes are first placed upon the conveyor K, they are very delicate and crumbs are apt to break off therefrom. If these crumbs were to drop into the icing, they would be deposited upon the cakes, interfering with the smoothness of the surface. I therefore utilize the conveyor K for also ejecting any crumbs that may drop off from the cakes and to this end a plan X is arranged beneath the conveyor and between the same and the conveyor L. Any crumbs breaking from the cakes will drop into this pan and the return movement of the blades or bars M will scrape the crumbs outward to a discharge spout X'. A pan Y which is kept at a predetermined temperature by a water jacket $Y^2$ is also arranged beneath the conveyor L to receive any drippings of the icing and the return portion of this conveyor will scrape this pan, carrying the icing drippings to a chute Y' for returning to the receptacle A.

The operation of icing is accomplished best under certain temperature conditions and to maintain these conditions without regard to the temperature of the external atmosphere, I preferably surround the apparatus with a water jacket. This is indicated at $Z^5$ and by placing water at a predetermined temperature in the jacket, the temperature of the icing may be maintained constant.

The tops of baked cakes are never absolutely flat, but are of a more or less convex form. In order to remove the surplus icing from these tops, I preferably arrange above the conveyor L a scraper, which is so suspended as to be capable of adjusting itself into conformity to the surface of the cake. Preferably, this scraper is a blade Z, which is loosely hung from rods Z' so as to extend into the path of the iced cakes traveling on the conveyor L. As each cake passes the blade Z, the latter will be turned into oblique position and will lightly scrape over the top, also adjusting itself to the contour of the cake. This will remove the surplus icing and equalize the distribution of the same over the top of the cake. The icing thus removed will drop down through the conveyor into the heated pan Y and will be returned to the icing receptacle A by the mechanism previously described.

To insure a proper transfer of the cake to the basket the conveyor K is provided with guides K', which will cause the cake to be properly positioned when the rocker member N operates to transfer. In case that a following cake should extend out over the end of the conveyor where it might be broken by the operation of the plunger, the basket E is provided with a wire guard E' comprising a series of vertically extending wires, which are of sufficient length and slant to gradually force such cakes backward upon the conveyor, upon downward movement of the plunger.

After the cakes pass from the conveyor L to the conveyor W, they rest upon a piece of waxed paper fed from a supply roll W' suspended under the former conveyor, which paper is fed and cut to predetermined lengths in timed relation with the conveyor.

What I claim as my invention is:

1. An apparatus for icing baked articles comprising a receptacle of dimensions but slightly in excess of those of the articles to be coated, means for maintaining constant level of the icing in said receptacle, and means for periodically immersing the articles to be iced in said receptacle.

2. An apparatus for icing baked articles comprising a container for a supply of icing, a small receptacle, means for feeding icing from said container to said receptacle and for returning a portion to said container to maintain a constant level in said receptacle, and means for successively immersing the articles to be coated in said receptacle.

3. An apparatus for icing baked articles comprising a receptacle of small dimensions, means for maintaining in said receptacle a constant quantity of icing, and a vertically movable plunger carrier for successively immersing the articles to be iced in said receptacle.

4. An apparatus for icing baked articles comprising a container for the icing, a small receptacle, means for feeding icing from said container to said receptacle, a pump for returning the icing from said receptacle to said container having its inlet arranged to maintain within said receptacle a constant supply, and a plunger carrier for successively immersing the articles to be iced in said tank to coat the bottom and sides thereof and to overflow the top.

5. An icing machine comprising a dipping receptacle, a carrier mounted for vertical reciprocation above said receptacle, laterally extending carriers in different planes, and timed operating mechanism for periodically advancing said carriers step-by-step and for intermittently reciprocating said vertical carrier to alternately register the same with said laterally extending carriers, and means for transferring articles respectively to and from said laterally extending carriers while in registration with said vertically reciprocating carrier.

6. In an icing machine, the combination with a receptacle for the icing, and means for dipping the articles to be iced therein, of a carrier for the articles to said dipping means, and means for removing the crumbs from said carrier.

7. In an icing machine, the combination with a receptacle for the icing, of means for dipping the articles to be iced therein, a carrier for said articles to and from said dipping means, and means actuated by said carrier for removing the crumbs and returning the drippings to said receptacle.

8. In an icing machine, the combination with a receptacle for the icing, of means for dipping the articles to be iced therein, a pair of carriers for respectively conveying the articles to be iced to said dipping means, and the iced articles away from said dipping means, said carriers being arranged in different planes, pans beneath said carriers for respectively catching the crumbs and the drippings, said carriers cooperating with said pans to remove the crumbs and return the drippings to said receptacle.

9. In an icing machine, the combination with a receptacle for the icing and means for dipping the articles to be coated therein, of means for conveying the iced articles from said dipping means, and means mounted above for automatically removing the surplus icing from the top of each iced article during the travel of the same.

10. In an icing machine, the combination with a receptacle for the icing and means for dipping the articles to be coated therein, of means for feeding the iced articles away from the dipping means, and a scraper loosely mounted above and in the path of said iced articles for scraping the same to remove the surplus icing and to equalize the distribution over the top of the article.

11. In an icing machine, the combination with a receptacle for the icing, of a basket for dipping the articles to be iced therein, a conveyor system for carrying said articles, and means upon the sides of said conveyor system for automatically aligning said articles with said basket.

12. In an icing machine, the combination with a receptacle for the icing, a plunger mechanism and a conveyor system for carrying the articles to be iced, of a basket member attached to said plunger for transferring the articles to said icing receptacle, and a guard on said basket to force a succeeding cake out of the path of the plunger.

13. In an icing machine the combination with a receptacle for the icing and means for dipping the articles to be iced therein, of conveyor systems for transporting articles to and away from the dipping means respectively, pans extending underneath said conveyor systems to catch crumbs dropped from the incoming articles and icing dropped from the outgoing articles and means for maintaining one of said pans at a predetermined temperature.

14. In an icing machine the combination with an icing receptacle and means for dipping the articles to be iced therein, of an endless conveyor for removing the iced articles, a pan extending beneath said conveyor for catching the icing dropped from said iced articles, means for maintaining said pan at a predetermined temperature and scraping blades upon said endless conveyor for returning to the icing receptacle the icing dropped upon the pan.

In witness whereof I affix my signature.

PEYTON R. JANNEY.